Nov. 5, 1957  S. A. COGSDILL  2,811,875
TWIST DRILL HAVING OIL PASSAGES THEREIN AND METHOD OF CONSTRUCTION
Filed April 11, 1956
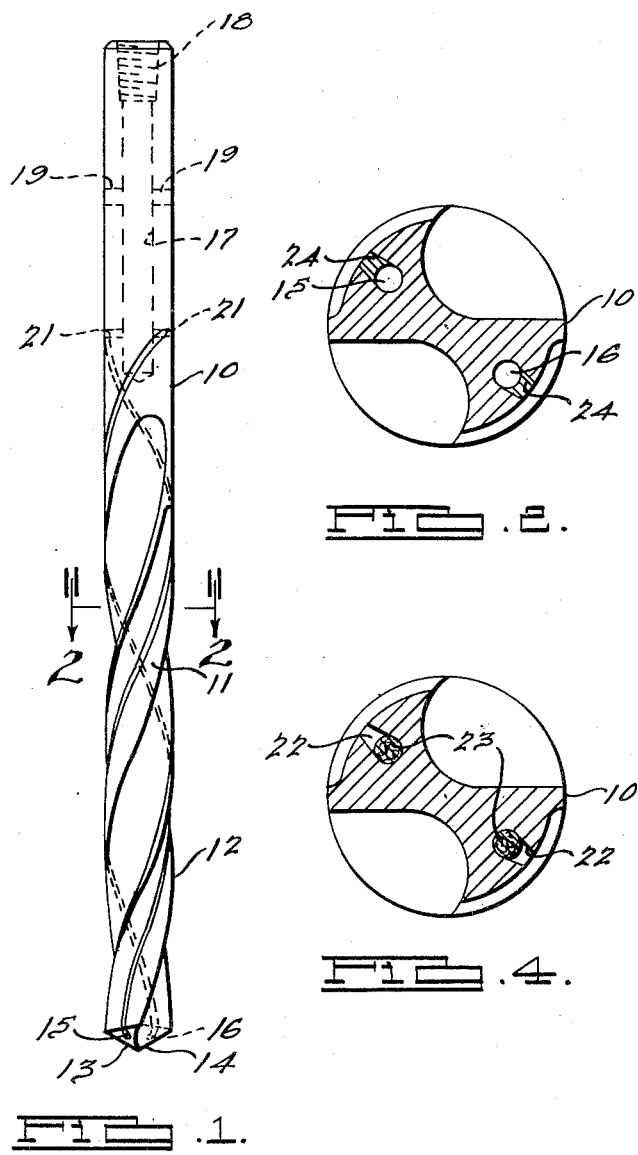
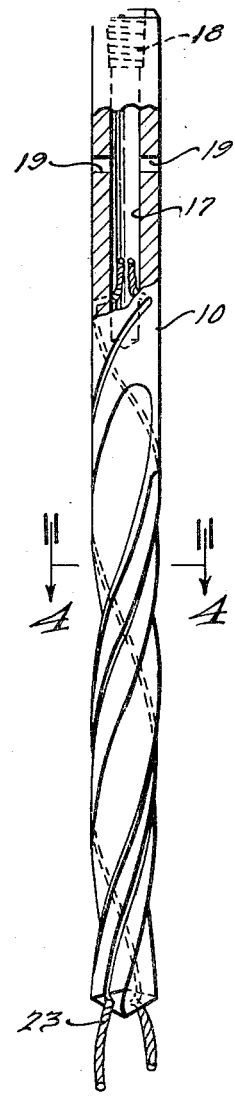
INVENTOR.
Stuart A. Cogsdill.
BY
Harness, Dickey & Pierce.
ATTORNEYS.

United States Patent Office 2,811,875
Patented Nov. 5, 1957

2,811,875

TWIST DRILL HAVING OIL PASSAGES THEREIN AND METHOD OF CONSTRUCTION

Stuart A. Cogsdill, Orchard Lake, Mich., assignor to Cogsdill Twist Drill Co., Detroit, Mich., a corporation of Michigan Application April 11, 1956, Serial No. 577,613

3 Claims. (Cl. 76—108)

This invention relates to twist drills, and particularly to a twist drill having coolant passageways throughout the length thereof, and is a continuation-in-part of application, Serial No. 471,585, filed November 29, 1954, now abandoned.

Difficulty has always been experienced in providing passageways in the lands of twist drills for the passage of a coolant from the shank to the cutting ends thereof.

The present invention pertains to the formation of passageways in the lands of the drill midway of the side edges thereof. After manufacture of the drill blank, channels are cut inwardly of the face of the lands centrally of the sides thereof. A cord, cable or other flexible element is placed in the bottom of the slots and a filling material is placed in the outer portion of the slot against the flexible element. The flexible elements are then pulled from the slots before the material hardens and adheres thereto, forming passageways from the shank to the cutting end of the lands. The outward part of the slot is closed by a hardenable plastic material made of steel powder and a synthetic resin which adheres to the sides of the wall and becomes hard after the cord or cable is removed from the bottom portion of the slot.

Accordingly, the main objects of the invention are: to provide a twist drill with passageways in the cutting end by the use of a synthetic plastic hardenable material which fills the outer part of slots cut in the land faces; to form a slot in the lands of a drill which has the bottom thereof filled with a removable flexible element and the outer portion closed with a hardenable plastic type of material containing steel powder which adheres to the sides of the slots and forms passageways when the elements are removed from the slots; to provide a drill having passageways in the lands thereof formed by slots having the outer area thereof closed by a hardenable plastic material containing steel particles; and, in general, to provide a drill with coolant passageways therein which is simple of construction and economical of manufacture.

Other objects and features of novelty of the invention will be specifically pointed out or will become apparent when referring, for a better understanding of the invention, to the following description taken in conjunction with the accompanying drawing, wherein:

Figure 1 is a view in elevation of a drill having passageways therein embodying features of the present invention;

Fig. 2 is an enlarged sectional view of the structure illustrated in Fig. 1, taken on the line 2—2 thereof;

Fig. 3 is a view of the drill in the course of construction; and

Fig. 4 is an enlarged sectional view of the structure illustrated in Fig. 3, taken on the line 4—4 thereof.

The drill 10 of the present invention is provided in the conventional manner with a pair of helical lands 11 and 12 which are oppositely disposed to each other, forming ends 13 and 14 having cutting edges and passageways 15 and 16 for a coolant which extends from the shank to the cutting end. The lands are formed on the tool body and a passageway 17 is drilled in the shank end communicating with transverse passageways 19 and 21 extending through the shank wall. Slots 22 are then milled into the face of the land, and due to the helical path followed by the milling wheel, such slots will be tapered, converging outwardly, as clearly illustrated in Figs. 2 and 4. After the slots are cut in the center of the lands to proper depth and into the slot 21, flexible elements 23, such as cord, wire, or preferably a cable formed of fine wires, are placed within the bottom of the slots, as illustrated in Fig. 4, one set of ends of the elements extending through the slots 21 into the passageway 17, with the other ends extending from the end faces 13 and 14 of the lands, as clearly illustrated in Fig. 3. Thereafter, the plastic material 24 is pressed within the slot against the flexible elements 23 and will soon harden and form a bond with the sides of the slots. A plastic hardenable material containing metal powder known to be suitable may be utilized, and preferably the material is made from a fine steel powder having a bonding synthetic resin associated therewith. A suitable material is sold in the trade under the name "Devcon" manufactured by Chemical Development Company, Danvers, Massachusetts. This material is made up of steel powder wetted by a synthetic resin which air-hardens. The material adheres to the walls of the slot and after setting, before final hardening, the two elements 23 are pulled from the end faces 13 and 14, leaving passageways 15 and 16 extending through the lands and communicating with passageways 21, 17 and 19. Thereafter, the wetted steel particles become bonded to each other and to the walls of the slots as the resin hardens and forms a bridge of steel across the slot which is completely closed and sealed thereby.

What is claimed is:

1. The method of forming passageways in the lands of a drill which includes the steps of: slotting the lands lengthwise thereof, placing a flexible element in the base of a slot, filling the outer part of the slot with a hardenable material containing metal powder and a hardenable resin, and withdrawing said flexible element before said material reaches completely hardened condition.

2. The method of forming passageways in lands of a drill having a passageway in the shank end which includes the steps of: providing a slot lengthwise of the lands which communicates with the passageway in the shank, placing a flexible cable-like element within the slot into the passageway, filling the outer part of the slot with a hardenable material containing metal powder and a synthetic resin which adheres to the wall of the outer portion of the slot when hard, and withdrawing said flexible cable-like element from the bottom of the slot before the material becomes hardened to thereby form sealed passageways in the lands communicating with the passageway in the shank.

3. The method of forming passageways in a drill having spaced lands which includes the steps of: forming tapered slots in said lands lengthwise thereof, the side walls of which converge toward each other outwardly from the bottom of the slot, placing a flexible element in the bottom of the slot, filling the outward portion of the slot with a hardenable material containing steel powder wetted with a synthetic resin, withdrawing said flexible element from the bottom of the slot before said material completely hardens to form sealed passageways through the land when the material hardens, and retaining said material within the outer portion of the slot by the converging walls and by the adhesion between the material and the walls.

References Cited in the file of this patent

UNITED STATES PATENTS 2,324,748    Welch _____ July 20, 1943